(12) United States Patent
Kriwan et al.

(10) Patent No.: US 9,746,488 B2
(45) Date of Patent: Aug. 29, 2017

(54) WIND SENSOR

(71) Applicant: Kriwan Industrie-Elektronik GmbH, Forchtenberg (DE)

(72) Inventors: Friedrich Kriwan, Forchtenberg (DE); Eduard Elfenbein, Forchtenberg (DE)

(73) Assignee: Kriwan Industrie-Elektronik GmbH (DE)

( * ) Notice: Subject to any disclaimer, the term of this patent is extended or adjusted under 35 U.S.C. 154(b) by 408 days.

(21) Appl. No.: 14/449,384

(22) Filed: Aug. 1, 2014

(65) Prior Publication Data

US 2015/0041451 A1 Feb. 12, 2015

(30) Foreign Application Priority Data

Aug. 9, 2013 (DE) .................. 10 2013 108 626

(51) Int. Cl.
| G01P 13/02 | (2006.01) |
| G01P 13/00 | (2006.01) |
| G01K 7/16  | (2006.01) |
| G01P 5/07  | (2006.01) |

(52) U.S. Cl.
CPC .............. *G01P 13/006* (2013.01); *G01K 7/16* (2013.01); *G01P 5/07* (2013.01); *G01P 13/02* (2013.01)

(58) Field of Classification Search
USPC ....................................... 73/170.07
See application file for complete search history.

(56) References Cited

U.S. PATENT DOCUMENTS

| 2,742,248 A | * | 4/1956 | Le Compte | ............ B64D 15/12 |
| | | | | 219/201 |
| 2,985,014 A | | 5/1961 | Doersam, Jr. | |
| 3,420,101 A | * | 1/1969 | Adams | .................. G01P 3/4802 |
| | | | | 340/870.15 |

(Continued)

FOREIGN PATENT DOCUMENTS

| CN | 101900742 B | 6/2012 |
| DE | 710457 C | 9/1941 |

(Continued)

OTHER PUBLICATIONS

Ammonit Anemometer Vaisala WAA252 S15100H reading material.

*Primary Examiner* — Dana Ross
*Assistant Examiner* — Renee Larose
(74) *Attorney, Agent, or Firm* — Renner Kenner Greive Bobak Taylor & Weber

(57) ABSTRACT

A wind sensor has a housing and a wind detection element, which is rotatably mounted on the housing and is formed by a wind wheel having a cup-star including a plurality of cups, wherein at least one ohmic heating element is incorporated in the wind wheel. Structures are provided for transferring energy between the housing and the ohmic heating element rotating with the wind wheel. The structures can include a primary coil arranged in the housing and a secondary coil arranged in the wind wheel, wherein the secondary coil is connected to the ohmic heating element. The plurality of cups of the wind wheel are each mounted by way of flat webs, wherein the webs extend into the cups and divide the cups into two regions, and the at least one heating element is embedded in the webs and extends into the region of the cups.

9 Claims, 5 Drawing Sheets

(56) References Cited

U.S. PATENT DOCUMENTS

| | | | | |
|---|---|---|---|---|
| 3,699,801 | A | * | 10/1972 | Jones ................. G01P 5/06 416/197 A |
| 3,713,336 | A | | 1/1973 | Bernstein et al. |
| 4,121,088 | A | | 10/1978 | Doremus et al. |
| 4,548,074 | A | * | 10/1985 | Krueter ............. G01P 13/045 73/170.02 |
| 5,639,963 | A | * | 6/1997 | Sustare, Jr. ............ G01P 5/07 73/170.07 |
| 6,895,812 | B2 | * | 5/2005 | Dahlberg ............... G01P 5/06 73/170.01 |
| 6,918,294 | B1 | | 7/2005 | Roberge |
| 7,971,478 | B2 | * | 7/2011 | Harrison ............... G01P 5/12 73/170.12 |
| 2008/0141768 | A1 | * | 6/2008 | Ormel ................ F03D 80/40 73/170.07 |
| 2011/0036160 | A1 | | 2/2011 | Pineau |
| 2011/0260455 | A1 | * | 10/2011 | Haar .................. F03D 3/06 290/44 |

FOREIGN PATENT DOCUMENTS

| | | |
|---|---|---|
| DE | 1101233 B | 3/1961 |
| DE | 2916504 B1 | 9/1980 |
| DE | 3736170 A1 | 5/1989 |
| DE | 202006000816 U1 | 3/2006 |
| EP | 0100715 A1 | 2/1984 |

\* cited by examiner

WIND SENSOR

TECHNICAL FIELD

The invention relates to a wind sensor having a housing and a wind detection element rotatably mounted on the housing, wherein the wind detection element can in particular be a wind wheel or a wind direction sensor.

BACKGROUND OF THE INVENTION

Wind sensors are also used in winter or in very cold locations. In order that the measurement signal is not falsified by accumulations of snow and ice, heated wind sensors are provided for such a use. In DE 710 457, in order to prevent ice build-up on wind wheel measurement instruments, the wind wheel blade is in the form of a hollow body, an electric heating coil being so arranged in a stationary manner that it projects into the hollow bodies. At extreme temperatures, however, ice build-up cannot reliably be avoided with such a solution.

From DE 29 16 504 B1 there is known an anemometer having a cup-star, in which an ohmic heating element is laid to reach into the cups. The transfer of energy from the stationary housing to the rotating cup-star thereby takes place via sliding contacts. CN 101900742 A proposes an anemometer with induction heating, in which the heat is generated by eddy currents in the region around the axis of rotation. With this solution too, ice build-up on the cups located further outwards cannot be ruled out at extreme temperatures.

SUMMARY OF THE INVENTION

The object underlying the invention is, therefore, to provide a wind sensor which reliably prevents the measurement results from being falsified by snow and ice.

The wind sensor according to the invention has a housing and a wind detection element rotatably mounted on the housing, wherein at least one ohmic heating element is incorporated in the wind detection element and means are provided for transferring energy between the housing and the ohmic heating element rotating with the wind detection element, which means comprise a primary coil arranged in the housing and a secondary coil arranged in the wind detection element, wherein the secondary coil is connected to the ohmic heating element. The wind sensor according to the invention has a housing and a wind detection element in the form of a wind wheel rotatably mounted on the housing. The wind wheel provides a cup-star having a plurality of cups, wherein at least one ohmic heating element is incorporated in the wind wheel and means are present for transferring energy between the housing and the ohmic heating element rotating with the wind wheel, which means comprise a primary coil arranged in the housing and a secondary coil arranged in the wind wheel, wherein the secondary coil is connected to the ohmic heating element. The plurality of cups of the wind wheel are each mounted by way of flat webs, wherein the webs extend into the cups and divide the cups into two regions, and the at least one heating element is embedded in the webs and extends into the region of the cups.

According to a further embodiment according to the invention, the wind sensor has a housing and a wind detection element in the form of a wind direction sensor rotatably mounted on the housing about an axis of rotation. The wind direction sensor has a wind vane on one side of the axis of rotation and a wind arrow on the other side, wherein at least one ohmic heating element is incorporated in the wind direction sensor and means are present for transferring energy between the housing and the ohmic heating element rotating with the wind direction sensor, which means comprise a primary coil arranged in the housing and a secondary coil arranged in the wind direction sensor, wherein the secondary coil is connected to the ohmic heating element. Both the wind vane and the wind arrow consist of two halves which are connected together, and the at least one heating element is embedded at least in the wind vane between the two halves.

The ohmic heating element has the advantage over a central heating source that it can be laid to reach into the outer periphery, that is to say into the cups, where it prevents interference from snow and ice. The inductive transfer of the energy required for the heating element can take place substantially without wear. Embedding the heating element between two halves of the wind detection element additionally permits optimum heat distribution.

Further embodiments of the invention are the subject-matter of the dependent claims.

According to a further embodiment of the invention, there are provided in the wind detection element at least one heating temperature sensor for detecting the temperature of the wind detection element and a secondary electronic control system, wherein the heating temperature sensor is connected to the secondary electronic control system for controlling the ohmic heating element in dependence on the temperature of the wind detection element. This measure serves primarily to protect the wind detection element from overheating. In addition, the energy consumption can be matched precisely to the actual requirement.

There can further be provided in the housing a primary electronic control system for controlling the primary coil. The primary electronic control system can also be connected to at least one housing temperature sensor. This in particular allows the housing temperature and/or outside temperature to be detected, so that a transfer of energy can be adapted purposively to the actual requirements.

The heating temperature sensor and/or the housing temperature sensor are preferably formed by a temperature-dependent resistor, in particular a PTC resistor and/or an NTC resistor and/or a Pt100 resistor and/or a Pt1000 resistor.

According to a further embodiment it is provided that the wind detection element is made of metal, which ensures good heat conduction. The cups of the cup-star can, for example, be at least approximately hemispherical.

According to a further embodiment, the two regions of the cups can be divided further by additional transverse elements arranged transversely to the web. Good heat distribution takes place by way of the webs and/or transverse elements. In particular when they are made of metal, the cups can easily be maintained at a temperature which prevents ice build-up.

In order to permit the best possible heat transfer, the at least one heating element is preferably arranged in a planar manner, in particular in a meandering pattern, in the wind detection element.

BRIEF DESCRIPTION OF THE DRAWINGS

Further advantages and embodiments of the invention will be described in greater detail hereinbelow with reference to the following description of two exemplary embodiments and the drawing.

In the drawings.

DETAILED DESCRIPTION OF ILLUSTRATIVE EMBODIMENTS

Figure 1:
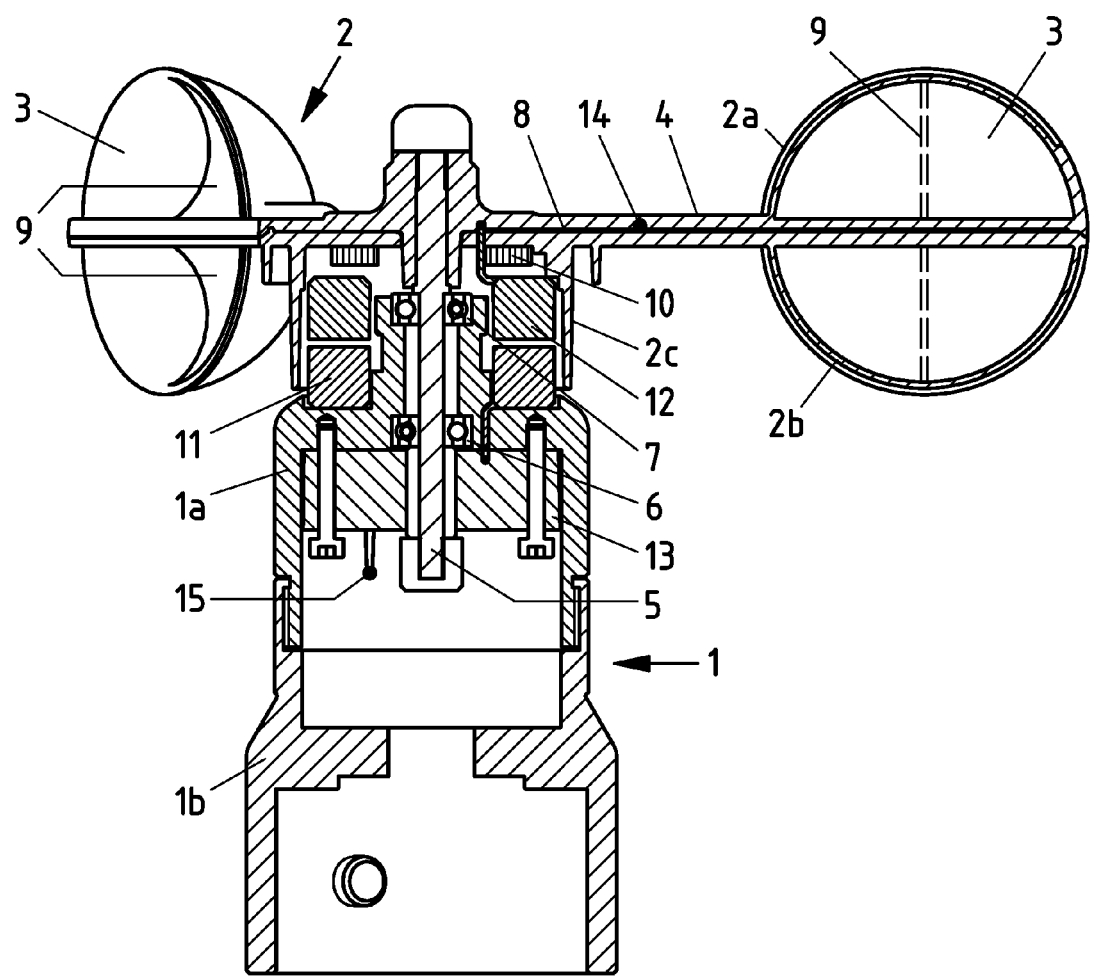
FIG. 1 shows a sectional view of a wind wheel.

The wind sensor shown in FIGS. 1 to 4 has a housing 1 which consists of an upper housing part 1a and a lower housing part 1b and has a wind detection element 2 rotatably mounted on the housing. The wind detection element 2 is a wind wheel which is formed by a cup-star having a plurality of cups 3, each of which is mounted by way of flat webs 4. The wind detection element 2 is rotatably mounted on the upper housing part 1a by means of a shaft 5 by way of bearings 6, 7.

Figure 2:
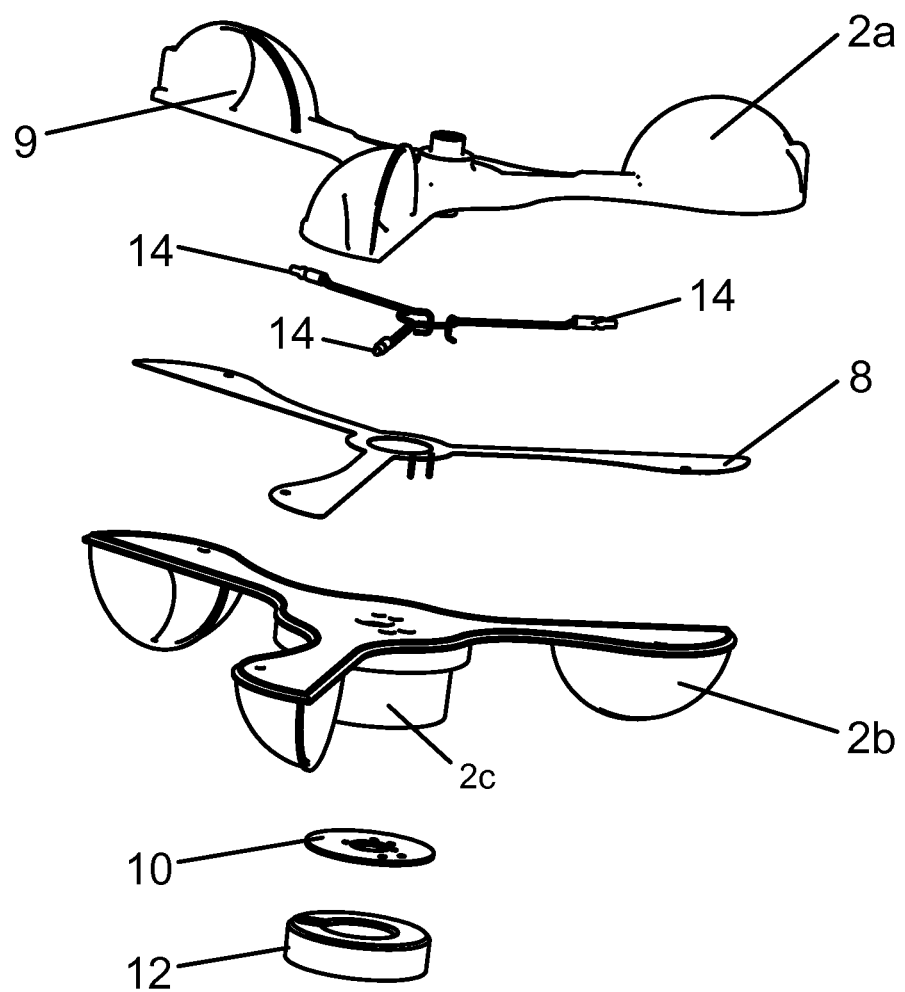
FIG. 2 shows a three-dimensional representation of the wind detection element of FIG. 1.
Figure 3:
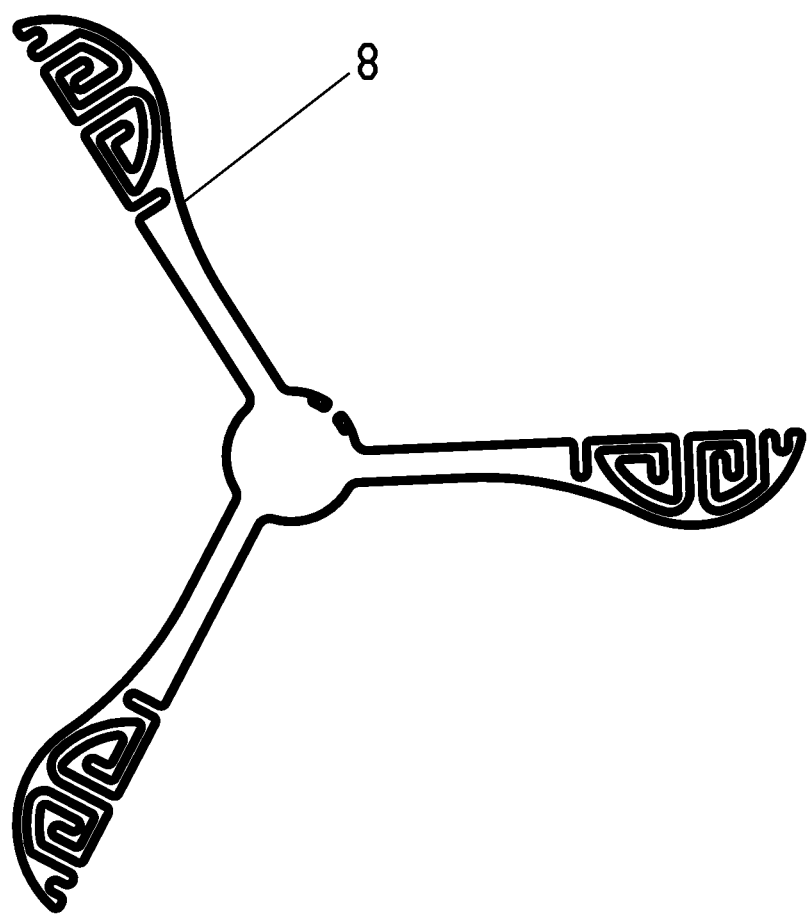
FIG. 3 shows a top view of the heating element of FIG. 1.
Figure 4:
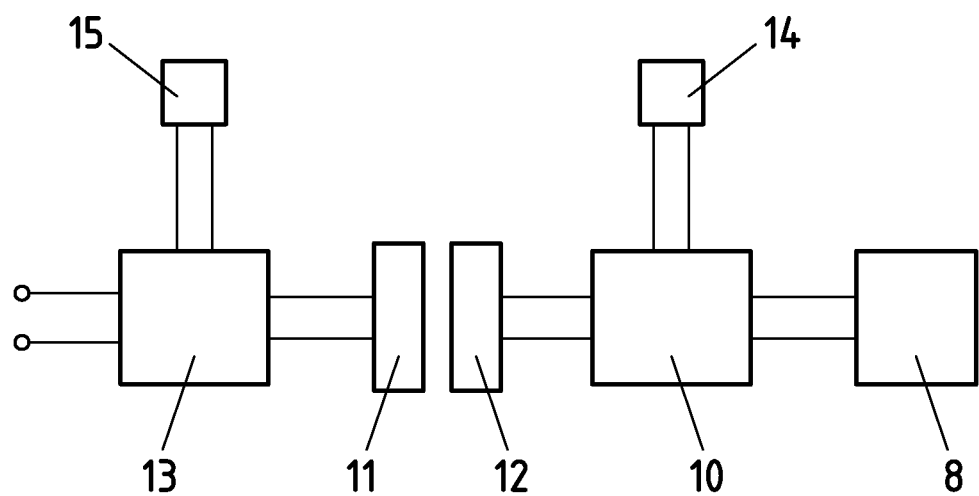
FIG. 4 shows an electrical block diagram.

As can be seen in particular from FIG. 2, the wind detection element 2 consists of two halves 2a, 2b which are connected together, at least one heating element 8 being embedded between the two halves. As can be seen from FIG. 3, the heating element is in planar form, in particular in a meandering pattern, and is adapted to the shape of the webs 4. The webs 4 extend into the cups 3, where they divide the cups 3 into two regions, which here have approximately the shape of a quarter of a circle. Because the wind is detected substantially by the cups, it is particularly important that snow and ice do not accumulate thereon. The heating element 8 therefore extends into the webs as far as the region of the cups. Because the wind detection element 2 is preferably made of metal, good heat propagation is possible. In order to improve the heat distribution even further in the region of the cups 3, further transverse elements 9 arranged transversely to the web 4 are provided therein, which transverse elements 9 again halve the regions having approximately the shape of a quarter of a circle.

The heating element 8 is an ohmic heating element, in particular a resistance wire, which is supplied with current via a secondary electronic control system 10. An inductive energy transfer further takes place between the housing 1 and the wind detection element 2 in that a primary coil 11 fixedly connected to the housing cooperates with a secondary coil 12 which rotates together with the wind detection wheel 2. The primary coil 11 is controlled by a primary electronic control system 13, which is connected to the power supply. A further particular feature is that the temperature of the wind detection element is measured by at least one heating temperature sensor 14 and taken into account in the secondary electronic control system 10 when controlling the heating element 8. This regulated control allows overheating of the heating element 8 reliably to be avoided. According to a further embodiment of the invention, the primary electronic control system 13 is also connected to at least one housing temperature sensor 15 for detecting the temperature of the housing or the outside temperature. In this manner, a transfer of energy can be adapted to the actual heating requirement of the wind detection element 2.

The primary coil 11 is attached in a stationary manner to the upper side of the upper housing part 1, while the secondary coil 12 and the secondary electronic control system 10 rotate together with the wind detection element 2. The two coils and the secondary electronic control system are thereby accommodated in a central cup-like part 2c of the wind detection element 2, which is adjacent to the upper housing part 1a and is open towards the housing part. The primary electronic control system 13, on the other hand, is arranged inside the upper housing part 1. Since three webs extend from the cup-like central part 2c to the three cups 3 in the exemplary embodiment shown, a heating temperature sensor 14 is provided in each web, which heating temperature sensor 14 can in particular be in the form of a temperature-dependent resistor (PTC resistor and/or NTC resistor, Pt100 resistor or Pt1000 resistor).

Figure 5:
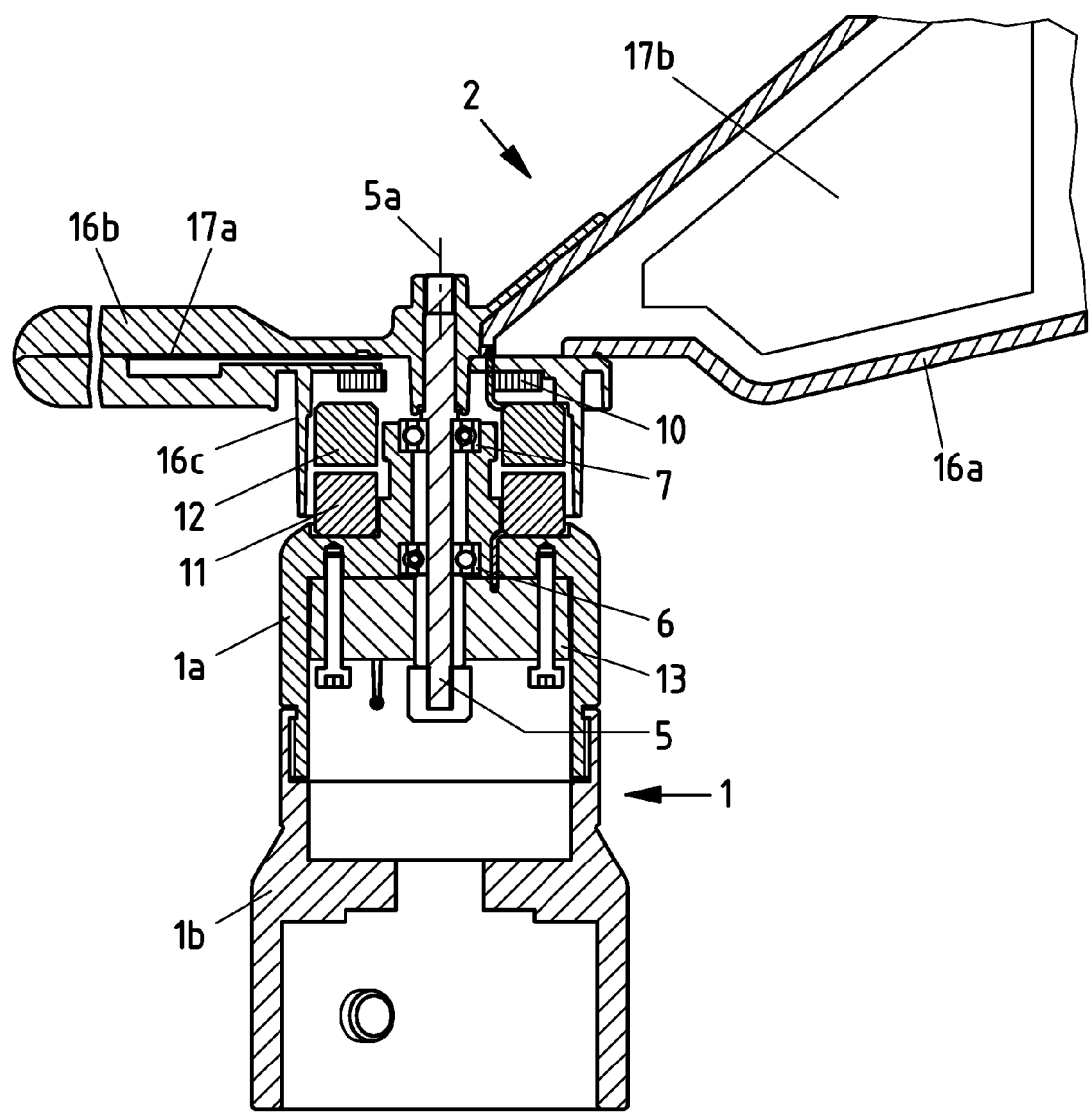
FIG. 5 shows a sectional view of a wind direction sensor.

FIG. 5 shows a wind sensor according to a second exemplary embodiment, which is in the form of a wind direction sensor. The housing 1 and also the electronic systems are of a corresponding construction to the first exemplary embodiment and are provided with the same reference numerals.

The wind direction sensor 16 is likewise fixed to the shaft 5 and is rotatable about an axis of rotation 5a formed thereby, a wind vane 16a being provided on one side of the axis of rotation and a wind arrow 16b being provided on the other side. Both the wind vane and the wind arrow are advantageously again composed of two halves, so that a heating element 17a and 17b can be embedded in each half. Here too, the wind vane 16a and the wind arrow 16b are made of metal in order to ensure the best possible heat conduction. The electronic systems, consisting of the primary coil 11, the secondary coil 12 and the secondary electronic control system 10, are again accommodated in a cup-like central part 16c.

In both exemplary embodiments, the heating element or elements are in a meandering pattern or are in planar form in order to distribute the heat energy over as large an area as possible. In both exemplary embodiments, excessive heating or even overheating of the wind detection element is reliably avoided by means of the heating temperature sensor and a transfer of energy to the heating elements that is regulated thereby. In addition, the transfer of energy, and thus also the energy consumption, can be adapted to the actual requirements via the primary electronic control system and the housing temperature sensor connected thereto.

The invention claimed is:

1. A wind sensor having a housing and a wind detection element which is rotatably mounted on the housing and is formed by a wind wheel which has a cup-star having a plurality of cups, wherein at least one ohmic heating element is incorporated in the wind wheel and means are present for transferring energy between the housing and the ohmic heating element rotating with the wind wheel, which means comprise a primary coil arranged in the housing and a secondary coil arranged in the wind wheel, wherein the secondary coil is connected to the ohmic heating element, characterised in that the plurality of cups of the wind wheel are each mounted by way of flat webs, wherein the webs extend into the cups and divide the cups into two regions, and the at least one ohmic heating element is embedded in the webs and extends into the region of the cups, characterised in that there is present in the wind detection element at least one heating temperature sensor for detecting the temperature of the wind detection element and a secondary electronic control system, wherein the heating temperature sensor is connected to the secondary electronic control system for controlling the ohmic heating element in dependence on the temperature of the wind detection element, characterised in that a primary electronic control system for controlling the primary coil is provided in the housing and the primary electronic control system is connected to at least one housing temperature sensor, and characterised in that the at least one heating temperature sensor or the at least one housing temperature sensor or both the at least one heating temperature sensor and the at least one housing temperature sensor is a temperature-dependent resistor.

2. A wind sensor having a housing and a wind detection element which is rotatably mounted on the housing and is formed by a wind wheel which has a cup-star having a plurality of cups, wherein at least one ohmic heating element is incorporated in the wind wheel and means are present for transferring energy between the housing and the ohmic heating element rotating with the wind wheel, which means comprise a primary coil arranged in the housing and a secondary coil arranged in the wind wheel, wherein the secondary coil is connected to the ohmic heating element, characterised in that the plurality of cups of the wind wheel are each mounted by way of flat webs, wherein the webs extend into the cups and divide the cups into two regions, and the at least one ohmic heating element is embedded in the webs and extends into the region of the cups, characterised in that a primary electronic control system for controlling the primary coil is provided in the housing, characterised in that the primary electronic control system is connected to at least one housing temperature sensor, characterised in that there is present in the wind detection element at least one heating temperature sensor for detecting the temperature of the wind detection element and a secondary electronic control system, wherein the heating temperature sensor is connected to the secondary electronic control system for controlling the ohmic heating element in dependence on the temperature of the wind detection element, and characterised in that the at least one heating temperature sensor or the at least one housing temperature sensor or both the at least one heating temperature sensor and the at least one housing temperature sensor is a temperature-dependent resistor.

3. Wind sensor according to claim 1, characterised in that the wind detection element is made of metal.

4. A wind sensor having a housing and a wind detection element which is rotatably mounted on the housing and is formed by a wind wheel which has a cup-star having a plurality of cups, wherein at least one ohmic heating element is incorporated in the wind wheel and means are present for transferring energy between the housing and the ohmic heating element rotating with the wind wheel, which means comprise a primary coil arranged in the housing and a secondary coil arranged in the wind wheel, wherein the secondary coil is connected to the ohmic heating element, characterised in that the plurality of cups of the wind wheel are each mounted by way of flat webs, wherein the webs extend into the cups and divide the cups into two regions, and the at least one ohmic heating element is embedded in the webs and extends into the region of the cups, and characterised in that the two regions of the cups are divided further by further transverse elements arranged transversely to the web.

5. A wind sensor having a housing and a wind detection element which is rotatably mounted on the housing and is formed by a wind wheel which has a cup-star having a plurality of cups, wherein at least one ohmic heating element is incorporated in the wind wheel and means are present for transferring energy between the housing and the ohmic heating element rotating with the wind wheel, which means comprise a primary coil arranged in the housing and a secondary coil arranged in the wind wheel, wherein the secondary coil is connected to the ohmic heating element, characterised in that the plurality of cups of the wind wheel are each mounted by way of flat webs, wherein the webs extend into the cups and divide the cups into two regions, and the at least one ohmic heating element is embedded in the webs and extends into the region of the cups, and characterised in that the at least one ohmic heating element is arranged in a meandering pattern in the wind detection element.

6. A wind sensor having a housing and a wind detection element which is rotatably mounted on the housing about an axis of rotation and is formed by a wind direction sensor which has a wind vane on one side of the axis of rotation and a wind arrow on the other side, wherein at least one ohmic heating element is incorporated in the wind direction sensor and means are present for transferring energy between the housing and the ohmic heating element rotating with the wind direction sensor, which means comprise a primary coil arranged in the housing and a secondary coil arranged in the wind direction sensor, wherein the secondary coil is connected to the ohmic heating element, characterised in that both the wind vane and the wind arrow consist of two halves which are joined together, and the at least one ohmic heating element is embedded at least in the wind vane between the two halves, characterised in that there is present in the wind detection element at least one heating temperature sensor for detecting the temperature of the wind detection element and a secondary electronic control system, wherein the heating temperature sensor is connected to the secondary electronic control system for controlling the ohmic heating element in dependence on the temperature of the wind detection element, characterised in that a primary electronic control system for controlling the primary coil is provided in the housing and the primary electronic control system is connected to at least one housing temperature sensor; and characterised in that the at least one heating temperature sensor or at least one housing temperature sensor or both the at least one heating temperature sensor and at least one housing temperature sensor is a temperature-dependent resistor.

7. A wind sensor having a housing and a wind detection element which is rotatably mounted on the housing about an axis of rotation and is formed by a wind direction sensor which has a wind vane on one side of the axis of rotation and a wind arrow on the other side, wherein at least one ohmic heating element is incorporated in the wind direction sensor and means are present for transferring energy between the housing and the ohmic heating element rotating with the wind direction sensor, which means comprise a primary coil arranged in the housing and a secondary coil arranged in the wind direction sensor, wherein the secondary coil is connected to the ohmic heating element, characterised in that both the wind vane and the wind arrow consist of two halves which are joined together, and the at least one ohmic heating element is embedded at least in the wind vane between the two halves, characterised in that a primary electronic control system for controlling the primary coil is provided in the housing, characterised in that the primary electronic control system is connected to at least one housing temperature sensor, characterised in that there is present in the wind detection element at least one heating temperature sensor for detecting the temperature of the wind detection element and a secondary electronic control system, wherein the heating temperature sensor is connected to the secondary electronic control system for controlling the ohmic heating element in dependence on the temperature of the wind detection element, and characterised in that the at least one heating temperature sensor or the at least one housing temperature sensor or both the at least one heating temperature sensor and the at least one housing temperature sensor is a temperature-dependent resistor.

8. Wind sensor according to claim 6, characterised in that the wind detection element is made of metal.

9. A wind sensor having a housing and a wind detection element which is rotatably mounted on the housing about an axis of rotation and is formed by a wind direction sensor which has a wind vane on one side of the axis of rotation and a wind arrow on the other side, wherein at least one ohmic heating element is incorporated in the wind direction sensor and means are present for transferring energy between the housing and the ohmic heating element rotating with the wind direction sensor, which means comprise a primary coil arranged in the housing and a secondary coil arranged in the wind direction sensor, wherein the secondary coil is connected to the ohmic heating element, characterised in that both the wind vane and the wind arrow consist of two halves which are joined together, and the at least one ohmic heating element is embedded at least in the wind vane between the two halves, and characterised in that the at least one ohmic heating element is arranged in a meandering pattern in the wind detection element.

\* \* \* \* \*